United States Patent [19]

Gilley

[11] Patent Number: 4,515,484

[45] Date of Patent: May 7, 1985

[54] TEMPERATURE TESTING APPARATUS FOR AN ELECTRONIC CIRCUIT SUBSTRATE

[75] Inventor: James H. Gilley, Swepsonville, N.C.

[73] Assignee: AT&T Technologies, Inc., New York, N.Y.

[21] Appl. No.: 561,697

[22] Filed: Dec. 15, 1983

[51] Int. Cl.³ ............................................. G01K 11/00
[52] U.S. Cl. ..................... 374/137; 374/102; 374/103; 136/230; 339/17 C; 339/254 R
[58] Field of Search ............... 29/593, 574, 405, 705; 236/DIG. 6; 40/11 R, 11 A, 16.6, 20 A, 26; 374/102, 103, 158, 194, 137, 153; 267/151, 158; 361/400; 339/17 C, 17 M, 17 LM, 254 R, 254 M; 136/230, 232, 233, 235

[56] References Cited

U.S. PATENT DOCUMENTS 2,282,441  5/1942  Whitlock ..................... 236/DIG. 6
3,001,173  9/1961  Swengel ........................ 339/254 R Primary Examiner—Steven L. Stephan
Assistant Examiner—Thomas B. Will
Attorney, Agent, or Firm—W. G. Dossé; S. I. Rosen

[57] ABSTRACT

To test the soldering temperature on the upper surface of an electronic circuit ceramic substrate (16) that is conveyed on a moving belt (12) over a plurality of heater platens (10), a thermocouple (20) is yieldably pressed to the upper surface of the substrate by a pressing mechanism (22). The pressing mechanism (22) comprises two flat springs (54 and 56) that press an insulator (52) down onto the thermocouple (b 20). The flat springs (54 and 56) are in turn pressed toward the upper surface of the substrate (16) by a coil spring (62) which pushes down onto a pressure plate (60). The pre-load of the coil spring (62) is manually adjusted by a nut (64) that has a groove (66) around which the wire (24) of the thermocouple (20) is wrapped for strain relief, as the wire extends to a digital readout device (26) that rides on the belt (12) along with the substrate (16).

7 Claims, 3 Drawing Figures

4,515,484

TEMPERATURE TESTING APPARATUS FOR AN ELECTRONIC CIRCUIT SUBSTRATE

GOVERNMENT CONTRACT

The Government has rights in this invention pursuant to Contract No. N00039-78-C-0006 awarded by the Department of the Navy.

TECHINCAL FIELD

This invention relates to apparatus for testing a time-dependent temperature profile and more particularly to an apparatus including an electronic circuit substrate having a surface exposed to a source of heat and a test surface, the temperature profile of which is to be tested, and for holding a temperature sensor onto the test surface.

BACKGROUND OF THE INVENTION

In the manufacture of electronic circuits on ceramic substrates, circuit conductors and tantalum resistances and sometimes many other types of circuit components are formed on the surface of a ceramic substrate. Land areas at each end of a tantalum resistor or at each end of a conductor form the contact points on which separate electronic component leads are bonded to the circuit elements that have been formed on the surface of the substrate. These land areas are sometimes solder plated but are preferably gold plated. Solder and flux are then placed on the land areas. The substrates carrying the separate components that are as yet not solder-fused to the land areas are then heated to reflow or fuse the solder at the land areas and thus bond the separate components to the circuit elements formed on the substrate to form a complete electronic circuit pack. Substrate heating is accomplished on a hot belt in a linear reflow soldering system sold by the Browne Corporation of Santa Barbara, Calif. under the model designation LR-6.

In the linear reflow soldering machine, a thermo-conductive belt is continuously moved over a series of heated platens, which are heated to the desired range of temperatures. The substrates carrying the separate circuit components, that are as yet not soldered to the surface of the substrates, are placed on the belt and travel over successive platens to heat the upper surface of the ceramic to the various desired soldering temperatures, in a particular sequence. The heat transfer is from the underlying platen, through the belt and through the ceramic to the solder-coated connector surfaces of the tantalum circuit elements formed on the surface of the substrate and then to the leads of the separate circuit components. Too low a temperature applied to the ceramic substrate will result in improper soldering. Too high a temperature could damage the separate components being soldered to the surface of the substrate.

In order to test the temperature profile of the upper surface of a substrate carried on the belt of the Browne Reflow Soldering Machine, at the various locations along the path of the belt, a thermocouple is held against the upper or test surface of a ceramic substrate used as a test fixture. The leads of the thermocouple are connected to a digital display unit. The substrate, with the thermocouple attached, and the digital display unit are placed on the belt and move along the belt as would a normal ceramic circuit pack being reflow soldered. The digital display unit, which stands on heat-resistant legs to protect the unit from the heat of the belt, is then read from time-to-time as the thermocouple-bearing substrate moves along the belt of the Browne Machine so that a series of time-dependent temperature readings can be obtained.

It is known to hold the thermocouple to the ceramic substrate with putty in order to attach the thermocouple to the top or tested surface of the ceramic substrate. However, this tends to give spurious readings due to the excessive insulating effect of the bonding material and, when the bonding material becomes loose, give oppositely spurious readings due to the poor contact between the thermocouple and the substrate. The bonding materials tend to have difficulty accommodating the wide temperature ranges encountered during the repeated heating and cooling cycles going from room temperature to the soldering temperature on the conveyer belt and then back to room temperature. Typically, putty would break up and fall off within a week.

SUMMARY OF THE INVENTION

The present invention relates to an apparatus for testing a time-dependent temperature profile on a test surface of an electronic circuit substrate having a heated surface. A temperature sensing means is held to the test surface by a flat spring oriented yieldably to press, with substantially one end thereof, the temperature sensing means against the test surface of the substrate, with a force proportional to the amount of flexure experienced by the flat spring. The flat spring is insulated from the temperature sensing means, and the other end of the flat spring is pressed toward the substrate with a force that is manually adjustable.

DETAILED DESCRIPTION

Figure 1:
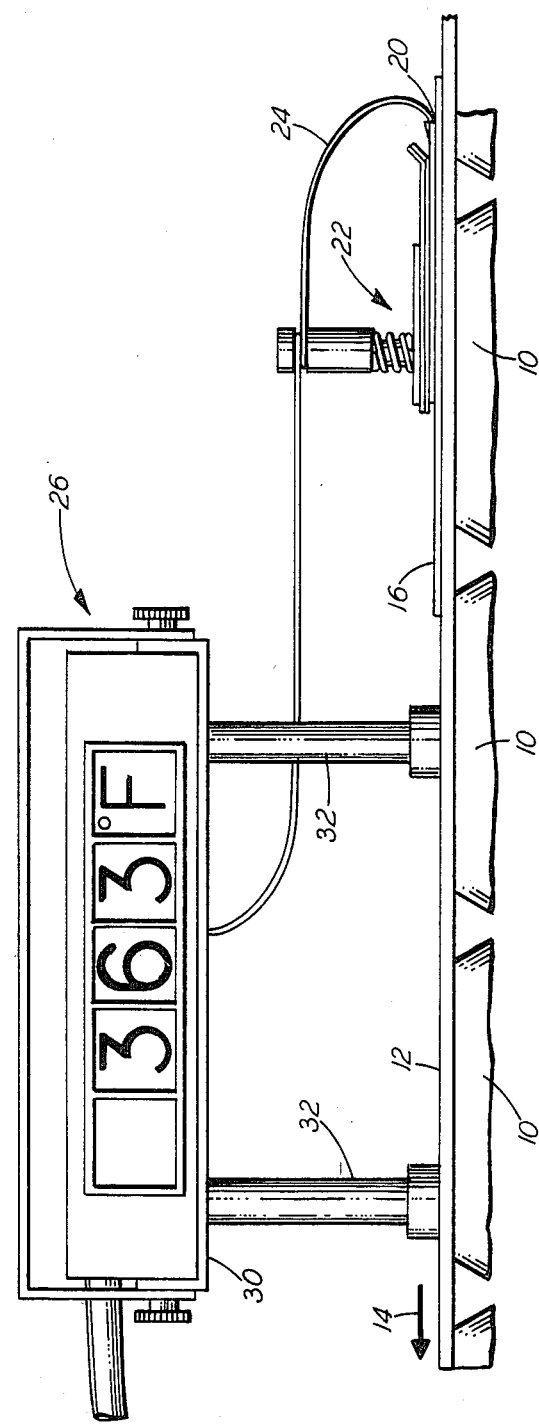
FIG. 1 is a partial schematic drawing of a belt heater showing the preferred environment of the present invention and its relation thereto.

Referring now to the accompanying drawings and more specifically to FIG. 1, several heater platens 10 are shown schematically. A belt 12 is arranged to move continuously in the direction of an arrow 14 at a controllable velocity over the tops of the platens 10, by means of some appropriate drive mechanism (not shown). The belt 12 is made of a relatively conductive material so as to conduct heat from the platens 10 in contact with its lower surface to the bottom of any object resting on its upper surface. An electronic circuit substrate 16, arranged for temperature testing as described below, is shown riding on top of the belt 12 with the bottom or heated surface thereof in direct contact with the upper surface of the belt. A thermocouple 20 is pressed against the upper or test surface of the substrate 16 by a pressing mechanism 22 which is described in greater detail below in conjunction with FIGS. 2 and 3. Two electrical wires 24, of the thermocouple 20, preferably running together in parallel, are connected to a digital readout device 26, which gives to the operator a visual display of the temperature sensed by the thermocouple. To avoid exposing the digital readout device 26 to the high temperature at the upper surface of the belt 12, the digital readout device is preferably mounted on a heat resistant platform 30, which is spaced from the belt by a plurality of legs 32. In this way, the digital readout device 26 can be placed so as to ride on the top of the belt 12 along with the test substrate 16. Electronic circuit paths or components can be present on the test surface of the substrate during temperature testing, but need not be.

Figures 2, 3:
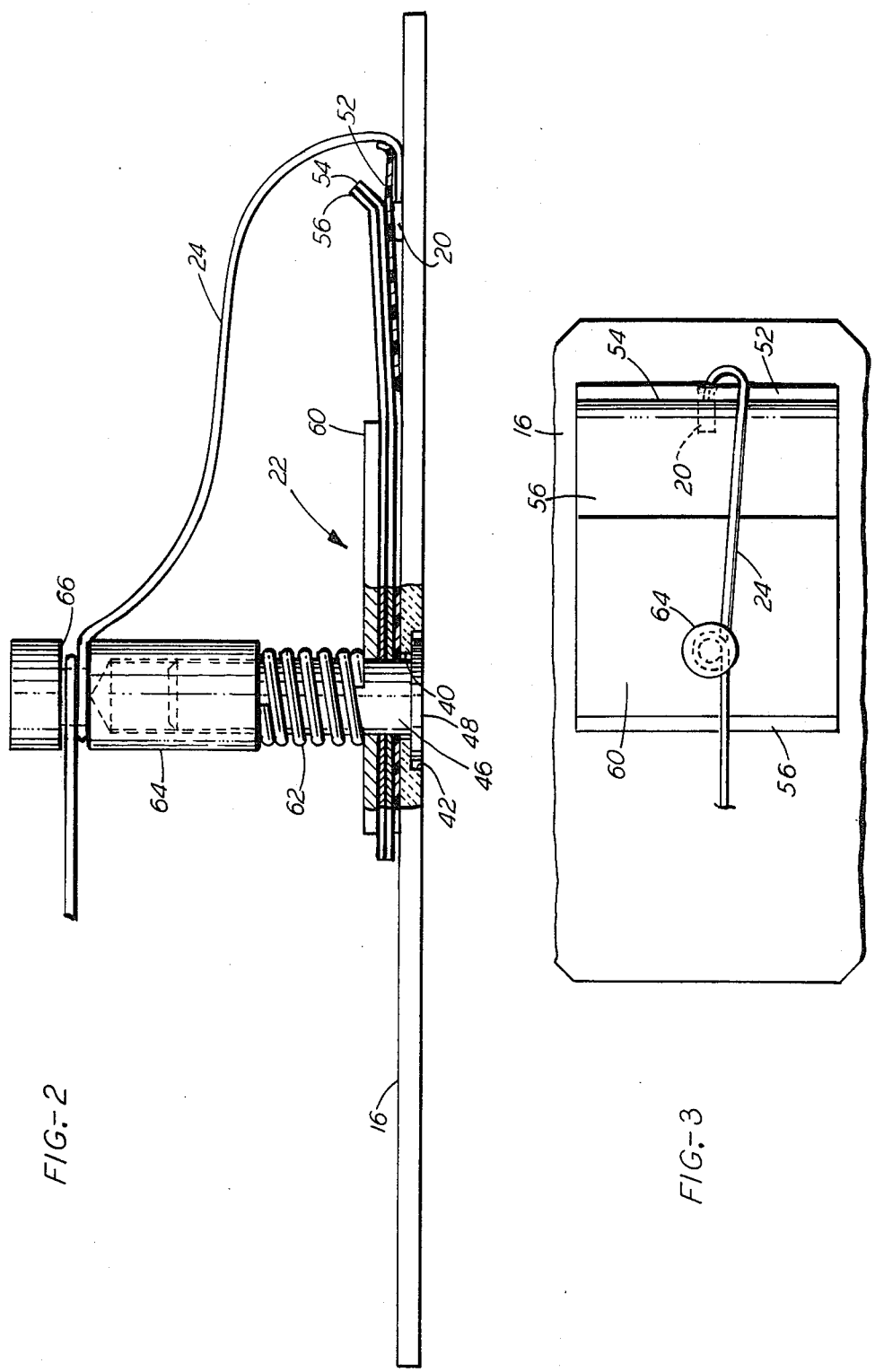
FIG. 2 is an enlarged side view showing a substrate partially in cross-section with a temperature sensing device being held thereto in accordance with the present invention.
FIG. 3 is a top view of the apparatus shown in FIG. 2.

Referring now to FIGS. 2 and 3, the side view and top view respectively, of the substrate 16 are shown with the pressing mechanism 22 in greater detail. The substrate 16 contains a hole 40, completely through its thickness. The bottom or heated surface of the substrate 16 contains a recess or relief 42, surrounding the hole 40 and extending partly through the thickness of the substrate. A bolt 46 having a head 48, projects through the hole 40, with the head lying within the relief 42. The head 48 is made to a thickness equal to, or less than, the depth of the relief 42 so that the head will not project beyond the lower surface of the substrate 16. An insulator 52, preferably formed of a synthetic resin polymer sheet, is positioned directly over the thermocouple 20. The insulator 52 is perforated to accommodate the bolt 46. Two flat springs 54 and 56 are located above the insulator 52 and also contain apertures to accommodate the bolt 46 which extends through the apertures in the flat springs. The flat springs 54 and 56 are arranged so that their upwardly flexure at their right-hand ends accommodates the body of the thermocouple 20 and presses down toward the upper or test surface of the substrate 16.

A pressure plate 60, having an aperture extending therethrough, is positioned over the left-hand portion of the flat springs 54 and 56. A coil spring 62 is positioned around the bolt 46 and is adapted to press down onto the pressure plate 60 and thus to press the pressure plate onto the left-hand end of the flat springs 54 and 56.

The upper end of the bolt 46 is threaded. A nut 64 contains internal threads which engage the threads on the bolt 64. The lower end of the nut 64 is arranged to engage and press down onto the top of the spring 62, to adjust the force applied by the spring to the top of the pressure plate 60. A wire-guiding groove 66 is formed near the top of the nut 64.

In order to use the present apparatus, the right-hand ends of the flat springs 54 and 56 are raised, along with the insulator 52. The flat springs 54 and 56 bend in a cantilever fashion. When the cantilever bending force from the flexure of the springs 54 and 56 reaches sufficient proportions, it deflects the pressure plate 60 against the bias of the spring.62, which has been preloaded by manually tightening the nut 64, for a manual adjustment of the preload point at which the pressure plate will begin to move. The body of the thermocouple 20 is then inserted between the insulator 52 and the upper surface of the ceramic substrate 16. The insulator 52, along with the flat springs 54 and 56, are then released to bear down onto and press the thermocouple 20 onto the surface of the substrate 16. The wires 24, extending from the thermocouple 20, are wrapped in the groove 66 and extend up to the digital readout device 26, as shown in FIG. 1. The digital readout device 26, and the substrate 16 with the thermocouple 20, clamped to it are then placed at suitable locations on the belt 12, which is then moved across the platens 10 so that the operator can note the temperature reached at the top surface of the ceramic substrate 16 as it advances on the belt.

What is claimed is:
1. An apparatus for testing the reflow-soldering temperature profile on an electronic circuit substrate having a heated surface exposed to a source of heat and a test surface where the reflow soldering is to take place and which has the temperature profile to be tested, comprising:
 an aperture extending through the substrate between the two surfaces, with a recess surrounding the aperture and adjacent to the heated surface;
 a bolt having a head, the bolt extending through the aperture in the substrate and beyond, with the head of the bolt located in the recess;
 screw threads on a portion of the bolt extending beyond the test surface of the substrate;
 a flat spring having an aperture therethrough, the flat spring oriented to bear against the test surface of the substrate, with the bolt extending through the aperture in the flat spring;
 a pressure plate having an aperture therethrough, the pressure plate oriented to press the flat spring against the test surface of the substrate, with the bolt extending through the aperture of the pressure plate;
 a coil spring positioned around the bolt and oriented to press the pressure plate toward the test surface of the substrate;
 a nut having internal threads engaging the threads of the bolt, the threaded engagement being sufficient for the nut to deflect the coil spring by an arbitrary amount;
 a wire-guiding groove extending around the nut;
 a thermocouple having at least one electrical wire extending therefrom, the thermocouple located between the substrate and the flat spring, the flat spring being deflected sufficient to accommodate and exert a force upon the thermocouple to hold the thermocouple in place, the thermocouple wire being wrapped about the wire-guiding groove; and
 a flexible thermal and electrical insulator located between the flat spring and the thermocouple.

2. An apparatus for testing a time-dependent temperature profile comprising:
 an electronic circuit substrate having a heated surface exposed to a source of heat and a test surface having the temperature profile to be tested;
 means for sensing the temperature of the test surface of the substrate;
 a flat spring having two ends and oriented to yieldably press with substantially one end thereof the temperature-sensing means against the test surface of the substrate with a force proportional to the amount of flexure experienced by the flat spring;
 means for thermally insulating the flat spring from the temperature-sensing means; and
 means for pressing the other end of the flat spring toward the test surface of the substrate, with a force that is manually adjustable.

3. An apparatus according to claim 2 wherein the sensing means comprises a thermocouple located in contact with the test surface of the substrate.

4. An apparatus according to claim 3 wherein the insulating means comprises a flat sheet of flexible insulating material located between the thermocouple and the flat spring.

5. An apparatus according to claim 2 wherein the pressing means comprises:
- a pressure plate in contact with the side of the flat spring opposite from the sensing means and oriented to press the flat spring toward the test surface of the substrate;
- a coil spring having two ends, oriented with one of its two ends arranged to press the pressure plate toward the test surface of the substrate; and
- means for manually moving the other end of the coil spring toward and away from the substrate.

6. An apparatus for testing a time-dependent, reflow-soldering temperature profile of an electronic circuit substrate having a heated surface exposed to a source of heat and a test surface where the reflow soldering is to take place and which has the temperature profile to be tested, comprising:
- a thermocouple having at least one electrical wire extending therefrom, the thermocouple located in contact with the test surface of the substrate;
- a flexible thermal and electrical insulator in contact with the thermocouple and located on the side of the thermocouple opposite from the substrate;
- a flat spring in contact with the side of the insulator opposite from the thermocouple and oriented to press the thermocouple against the test surface of the substrate;
- a pressure plate in contact with the side of the flat spring opposite from the insulator and oriented to press the flat spring toward the test surface of the substrate;
- a coil spring oriented to press the pressure plate toward the test surface of the substrate and means to selectively read the temperature sensed by the thermocouple.

7. An apparatus according to claim 6 wherein the substrate has an aperture therethrough, between the heated and test surfaces, with a recess surrounding the aperture and adjacent to the heated surface; further including a bolt having a head, the bolt extending through the aperture in the substrate and beyond, with the head of the bolt located in the recess; screw threads on a portion of the bolt extending beyond the test surface of the substrate; and a nut having internal threads engaging the threads of the bolt, the threaded engagement being sufficient for the nut to deflect the coil spring by an arbitrary amount.

* * * * *